(12) United States Patent
Chung et al.

(10) Patent No.: US 7,169,885 B2
(45) Date of Patent: Jan. 30, 2007

(54) POLYIMIDE MEMBRANES

(75) Inventors: Tai-Shung Neal Chung, Ann Arbor, MI (US); Mei Lin Chng, Singapore (SG); Lu Shao, Harbin (CN)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 10/713,869

(22) Filed: Nov. 14, 2003

(65) Prior Publication Data

US 2004/0177753 A1    Sep. 16, 2004

Related U.S. Application Data

(60) Provisional application No. 60/453,971, filed on Mar. 13, 2003.

(51) Int. Cl.
*C08F 6/00* (2006.01)

(52) U.S. Cl. ............... 528/480; 95/43; 96/14; 210/500.39; 525/436; 528/353

(58) Field of Classification Search ........... 528/353, 528/480; 95/43; 96/14; 525/436; 210/500.39
See application file for complete search history.

(56) References Cited

U.S. PATENT DOCUMENTS

| 4,717,393 A | 1/1988 | Hayes | 55/16 |
| 4,981,497 A | 1/1991 | Hayes | 55/16 |
| 6,639,042 B1 * | 10/2003 | Baek et al. | 528/170 |

FOREIGN PATENT DOCUMENTS

WO    WO 99/40996    8/1999

OTHER PUBLICATIONS

L.M. Robeson, Correlation of separation factor versus permeability for polymeric membranes, *J. Membr. Sci.*, 62 (1991) 165.
M.S. McCaig, D. R. Paul, Effect of UV cross-linking and physical aging on the gas permeability of thin glassy polyarylate films, *Polymer* 40 (1999) 7209.
Y. Liu, C. Y. Pan, M. X. Ding, J. P. Xu, Gas permeability and permselectivity of photochemically crosslinked copolyimides, *J. Appl. Polym. Sci.* 73 (1999) 521.
J. H. Fang, H. Kita, K. Okamoto, Hyperbranched polyimides for gas separation applications. 1. Synthesis and characterization, *Macromolecules*, 33 (2000) 4693.
W. J. Koros, G. K. Fleming, Membrane-based gas separation, *J. Membr. Sci.*, 83 (1993) 1.
A. Bos, I. G. M. Punt, M. Wessling, H. Strathmann, Plasticization-resistant glassy polyimide membranes for CO/CH separations, *Separation and Purif. Tech.* 14 (1998) 27.
S. A. Stern, Polymers for the gas separation: the next decade, *J. Membr. Sci.*, 94 (1994) 1.
M. E. Rezac, B. Schoberl, Transport and thermal properties of poly(ether imide)/ acetylene-terminated monomer blends, *J. Membr. Sci.* 156 (1999) 211.
Y. Liu, R. Wang, T. S. Chung, Chemical cross-linking modification of polyimide membranes for gas separation, *J. Membr. Sci.*, 189 (2001) 231.
H. Kita, T. Inada, K. Tanaka, K. Okamoto, Effect of photocrosslinking on permeability and permselectivity of gases through benzophenone-containing polyimide, *J. Membr. Sci.* 87 (1994) 139.
Y. Liu, C. Y. Pan, M. X. Ding, J. P. Xu, Gas permeability and permselectivity of polyimides prepared from phenylenediamines with methyl substitution at the ortho position, *Polymer Int.*, 48 (1999) 832.
Y. Liu, M. X. Ding, J. P. Xu, Gas permeabilities and permselectivity of photochemically cross-linked polyimides, *J. Appl. Polym. Sci.* 58 (1995) 485.
C. Staudt-Bickel, W. J. Koros, Improvement of $CO_2/CH_4$ separation characteristic of polyimides by chemical crosslinking, *J. Membr. Sci.* 155 (1999) 145.
M. Al-Masri, H. R. Kricheldorf, D. Fritsch, New polyimides for gas separation, 1. polyimides derived from substituted terphenylenes and 4,4'-(hexafluoroisopropylidene)diphthalic anhydride, *Macromolecules*, 32 (1999) 7853.
W. J. Koros, R. Mahajan, Pushing the limits on possibilites for large scale gas separation: which strategies?, *J. Membr. Sci.* 175 (2000) 181.
A. Bos, I. G. M. Punt, M. Wessling, H. Strathmann, Suppression of $CO_2$-plasticiization by semiiterpenetrating polymer network formation, *J. Polym. Sci., Part B: Polym. Phys.* 36 (1998) 1547.

* cited by examiner

*Primary Examiner*—Terressa Boykin
(74) *Attorney, Agent, or Firm*—Klarquist Sparkman, LLP.

(57) ABSTRACT

The present invention deals with a process for treating a polyimide comprising exposing said polyimide to a compound selected from the group consisting of dendrimers, hyperbranched polymers and mixtures thereof. The polyimide may be in the form of a membrane and the membrane, after treatment according to the process of the invention, may be suitable for use in a membrane-based separation technique, for example gas separation, filtration, microfiltration, ultrafiltration, reverse osmosis or pervaporation. The membrane may for example be suitable for separation of gas and hydrocarbon mixtures including mixtures of $H_2/N_2$, $H_2/CO_2$, $He/N_2$, $CO_2/CH_4$, and C2–C4 hydrocarbon mixtures.

14 Claims, 4 Drawing Sheets

POLYIMIDE MEMBRANES

CROSS REFERENCE TO RELATED APPLICATION

This claims the benefit of Provisional Application No. 60/453,971, filed Mar. 13, 2003, which is incorporated herein by reference.

FIELD OF THE INVENTION

The present invention relates to a process for treating polyimides, and to membranes comprising polyimides treated by said process. It further relates to a method for separation of gases using said membranes.

BACKGROUND OF THE INVENTION

Polymeric membrane materials for gas separation should not only have good gas separation properties, for example high gas permeability and permselectivity, but should also maintain their intrinsic gas separation properties in complex and harsh environments. Polyimides are attractive membrane materials for gas separation because of their good gas separation and physical properties. Many attempts have been made to modify the chemical structure of polyimides with the aim of obtaining both highly permeable and permselective membrane materials. However most of the polyimides produced either have relative low selectivity or suffer severe ageing and performance decay due to densification and/or plasticization. In order to overcome these problems, cross-linking modifications have been carried out.

Results suggest that cross-linking provides membranes with anti-plasticization properties and good chemical resistance. In addition, the gas permeability/permselectivity relationships of some cross-linked polyimides were higher than the normal trade-off line.

Cross-linking of polyimides can be effected by several methods. For example, one method uses UV light induced photochemical cross-linking reactions in benzophenone-containing polyimides, however the difficulty of implementing the method uniformly on hollow fibre membranes limits its application Another method uses the formation of semi-interpenetrating networks using polymeric blends, and subsequent thermal treatment at elevated temperatures. This method has the potential to yield materials with better anti-plasticization characteristics, however heat treatment is time consuming and is not a preferred process economically. Copolyimides containing strong polar carboxylic acid groups may exhibit reduced plasticization due to hydrogen bonding between the carboxylic acid groups. However, cross-linking reactions between ethylene glycol and carboxylic acid groups in diaminobenzoic acid (DABA) based polyimides commonly occur at around 150° C. A disadvantage of heat treatment at elevated temperatures is the deterioration of the subtle structures of asymmetric membranes and impairment of their gas permeation properties.

Therefore, it is necessary to use low temperature cross-linking methods for the successful modification of asymmetric membranes.

To date, the only simple, practical chemical cross-linking method to modify 6FDA-polyimide asymmetric hollow fibers has been performed by Liu, Wang and Chung (Y. Liu, R. Wang, T. S. Chung, "Chemical cross-linking modification of polyimide membranes for gas separation", *J. Membr. Sci.*, 189 (2001) 231). Their process involves immersing fibers into a p-xylenediarine or m-xylenediamine/methanol solution for a short period of time at ambient temperature.

OBJECT OF THE INVENTION

It is the object of the present invention to overcome or substantially ameliorate at least one of the above disadvantages. It is a further object to provide high performance or stable membranes for gas/vapour separation.

SUMMARY OF THE INVENTION

In a first aspect of the invention there is provided a process for treating a polyimide comprising exposing said polyimide to a compound selected from the group consisting of dendrimers, hyperbranched polymers and mixtures thereof.

The polyimide may be in the form of a membrane. The compound may comprise a plurality of amine groups, and at least two amine groups per molecule of said compound may be primary amine groups. The compound may crosslink the membrane. The dendrimer may be a polypropyleneimine dendrimer, and may be of generation up to 4. The polyimide may be an aromatic polyimide. The process may comprise dissolving the compound in a first solvent, and the concentration of the compound in the first solvent may be between about 1 wt % and about 30 wt %. The process may be conducted at a temperature below about 100° C. Following exposure of the membrane to the compound, the membrane may be washed with a second solvent and may then be dried.

There is also provided a polyimide when obtained by the process of the first aspect, and there is also provided a membrane comprising said polyimide.

In a second aspect of the invention there is provided a method for at least partially separating at least one gas from a mixture of gases comprising bringing said mixture of gases into contact with a first side of a membrane according to the invention, whereby a pressure on the first side of the membrane is greater than a pressure on a second side of the membrane.

In a third aspect of the invention there is provided a gas separation module comprising a membrane according to the invention.

In a fourth aspect of the invention there is provided a pervaporation module comprising a membrane according to the invention.

BRIEF DESCRIPTION OF THE DRAWINGS

FIG. 1 shows a FTIR-ATR spectra of a 6FDA-Durene polyimide membrane film before and after cross-linking with a DAB dendrimer;

FIG. 2 shows a graph of gel content (%) vs. cross-linking time (min) of cross-linked 6FDA-Durene polyimide membrane films resulting from different generations of DAB dendrimers;

FIG. 3 shows a graph of selectivity vs. cross-linking time (min) for the data as presented in Table 2;

FIG. 4(a) shows a graph of $H_2/N_2$ selectivity vs. $H_2$ permeability for G1 cross-linked 6FDA-Durene polyimide membrane film; and FIG. 4(b) shows a graph of $H_2/N_2$ selectivity vs. $H_2$ permeability for G2 and G3 cross-linked 6FDA-Durene polyimide membrane films.

DETAILED DESCRIPTION OF THE INVENTION

The present invention relates to treatment of polyimides in order to confer improved chemical resistance, anti-plasticization characteristics and permselectivity relative to uncross-linked polyimides, by using suitable dendrimers (which may consist of multifunctional amines) as cross-linking reagents.

There is described herein a process for treating a polyimide membrane comprising exposing the membrane to a compound selected from the group consisting of dendrimers, hyperbranched polymers and mixtures thereof, wherein the compound comprises a plurality of amine groups, said compound being dissolved in a solvent under conditions whereby said compound crosslinks said membrane.

The polyimides of the invention are commonly in the form of membranes. The membranes may be gas separation membranes, microporous membranes, ultrafiltration membranes, reverse osmosis membranes or some other type of membrane, and they may be suitable for use in a membrane-based separation technique, for example gas separation, filtration, microfiltration, ultrafiltration, reverse osmosis or pervaporation. They may for example be suitable for separation of gas and hydrocarbon mixtures including mixtures of $H_2/N_2$, $H_2/CO_2$, $He/N_2$, $CO_2CH_4$, and C2–C4 hydrocarbon mixtures. The membranes may be in the form of dense films, asymmetric hollow fibres, dual layer hollow fibres, composite membranes of polyimides or other suitable form.

The polyimide may be an aromatic polyimide or a partially aromatic polyimide or a nonaromatic polyimide. In particluar, an aromatic polyimide suitable for use in the present invention may comprise the following structural unit:

wherein $Ar_1$ is a tetravalent organic group selected from the group consisting of:

wherein Z is selected from the group consisting of:

$Ar_2$ is an aromatic group selected from the group consisting of:

wherein Z has the same meaning as defined above, and

X, $X_1$, $X_2$ and $X_3$ are independently selected from the group consisting of hydrogen, allyl groups with 1 to 5 carbon atoms, alkoxy groups with 1 to 5 carbon atoms, phenyl groups, substituted phenyl groups, phenoxy groups and substituted phenoxy groups; and n is a number sufficient that said aromatic polyimide has an inherent viscosity of at least 0.3 dl/g when measured at 25° C. using a 0.5% by weight solution in N-methylpyrrolidi none. The aromatic polyimide may be selected from the group consisting of:
1) polyimides comprising groups derived from benzophenone tetracarboxylic anhydride dianhydride (BTDA), methylene diisocyanate (MDI) and toluene diisocyanate (MDI), (available commercially as polyimide P84 from Lenzing) and
2) polyimides of structure:

(available commercially as Matrimid from Ciba Specialty Chemicals).

The compounds of the present invention, used in treating a polyimide, are selected from the group consisting of dendrimers, hyperbranched polymers and mixtures thereof, and may comprise a plurality of amine groups. At least two amine groups per molecule of said compound may be primary amine groups. The dendrimer may be a polypropyleneimine dendrimer, and may be of generation up to 4, and may be generation 1, 2, 3 or 4, or may be generation greater than 4. These dendrimers have a high density of primary amino groups suitable for crosslinking a polyimide according to the process of the invention.

Dendrimers suitable for the treatment of the present invention include polypropylenenimine dendrimers (DAB-AM dendrimers), which have primary amino groups. Generations 1 to 3 of polypropylenenimine have the following structures:

Polypropylenimine tetraamine dendrimer
(DAB-AM-4: generation 1)

Polypropylenimine octaamine dendrimer
(DAB-AM-8: generation 2)

Polypropylenimine hexadecaamine dendrimer
(DAB-AM-16: generation 3)

The process for treating a polyimide according to the present invention comprises exposing the polyimide to a compound which is a dendrimer, a hyperbranched polymer or a mixture thereof, and may comprise dissolving the compound in a first solvent before is said exposing. The first solvent may be an alcohol, for example methanol, ethanol, propanol, isopropanol, n-butanol, isobutanol or some other convenient alcohol. Other solvents that may be used include for example ketones such as acetone or methylethylketone, ethers such as diethyl ether, esters such as ethyl acetate or other solvents known to those skilled in the art. The concentration of the compound in the first solvent may be between about 1 wt % and about 50 wt %, or between about 2 and 40 wt % or between about 3 and 30 wt % or between about 4 and 20 wt % or between about 5 and 10%, or may be about 1, 2, 3, 4, 5, 6, 7, 8, 9, 10, 12, 14, 16, 18, 20, 25, 30, 35, 40, 45 or 50 wt %. The process may be conducted at about ambient temperature or at a temperature below about 100° C., or below about 80° C., or below about 60° C. or below about 40° C., or between about 0 and 100° C. or between about 10 and 80° C. or between about 20 and 60° C. or between about 30 and 50° C., and may be conducted at about 0, 10, 20, 30, 40, 50, 60, 70, 80, 90 or 100° C. The step of exposing may comprise immersing the polyimide in the compound or in a solution of the compound, or it may comprise passing the compound or a solution of the compound over the polyimide, or it may comprise spraying the polyimide with the compound or a solution of the compound, or it may comprise exposing the polyimide to the vapour of the compound, or it may comprise some other convenient method. The time of the exposure may be between about 1 second and 300 minutes, or between about 2 seconds and 270 minutes or between about 5 seconds and 240 minutes or between about 10 seconds and 210 minutes or between about 15 seconds and 180 minutes or between about 30 seconds and 150 minutes or between about 1 and 120 minutes or between about 2 and 100 minutes, or between about 5 and 80 minutes or between about 10 and 70 minutes or between about 15 and 60 minutes or between about 20 and 55 minutes or between about 25 and 50 minutes or between about 30 and 45 minutes, and may be about 1, 2, 5, 10, 15, 30 or 45 seconds, or about 1, 2, 3, 4, 5, 6, 7, 8, 9, 10, 15, 20, 25, 30, 35, 40, 45, 50, 55, 60, 70, 80, 90, 100, 120, 140, 160, 180, 200, 250 or 300 minutes, or it may be greater than 300 minutes. Following exposure of the membrane to the compound for an appropriate time, the membrane may be washed with a second solvent and may then be dried. Commonly the second solvent is an alcohol, and may be the same as the first solvent, or it may be a different solvent. Commonly the second solvent will be methanol, ethanol, propanol, isopropanol, n-butanol or isobutanol however other alcohols may be used. Other solvents that may be used include for example ketones such as acetone or methylethylketone, ethers such as diethyl ether, esters such as ethyl acetate or other solvents known to those skilled in the art. Drying may conveniently be conducted in air, and may be at ambient temperature or may be at a temperature below about 100° C., or below about 80° C., or below about 60° C. or below about 40° C., or between about 0 and 100° C. or between about 10 and 80° C. or between about 20 and 60° C. or between about 30 and 50° C., and maybe conducted at about 0, 10, 20, 30, 40, 50, 60, 70, 80, 90 or 100° C. Drying may be conducted by keeping the polyimide at ambient pressure or by applying a vacuum, or it may comprise passing a stream of gas past, through or over the polyimide. The time required for drying the membrane will depend on the conditions used for drying and on the nature of the solvents used in the process of treating the polyimide. Commonly the time required for drying will be between about 30 minutes and 48 hours, or between about 1 and 40 hours, or between about 2 and 32 hours or between about 3 and 24 hours or between about 4 and 20 hours or between about 5 and 16 hours or between about 6 and 12 hours, and may be about 0.5, 1, 2, 3, 4, 5, 6, 8, 10, 12, 16, 20, 24, 30, 36, 42 or 48 hours.

The membranes of the present invention may be suitable for use in a membrane-based separation technique, for example gas separation, filtration, microfiltration, ultrafiltration, reverse osmosis or pervaporation. They may for example be suitable for separation of gas and hydrocarbon mixtures including mixtures of $H_2/N_2$, $H_2/CO_2$, $He/N_2$, $CO_2/CH_4$, and C2–C4 hydrocarbon mixtures. They may also be suitable for separation of mixtures of vapours and for separation of mixtures of vapours and gases.

DETAILED DESCRIPTION OF THE PREFERRED EMBODIMENTS

A preferred process for treating a polyimide membrane according to the present invention comprises exposing the polyimide membrane to a polypropyleneimine dendrimer of generation between 1 and 3. The treatment process comprises dissolving the dendrimer in an alcohol, for example methanol, at a concentration of between about 5 wt % and about 30 wt %, and immersing the polyimide membrane in the a solution, which is kept at a temperature of between about 20 and 60° C. The membrane is kept in the solution for between about 1 second and 60 minutes. The membrane is then washed with an alcoholic solvent and dried. Drying may conveniently be conducted in air for up to about 1 day, and is commonly conducted at ambient temperature, or at elevated temperatures for a few seconds to minutes.

The membrane may then be mounted into a gas separation module. The conformation of the module will depend on the conformation of the treated polyimide membrane. For example, if the membrane is a flat sheet, the module may have a spiral wound configuration.

The membrane module may then be used for gas separation by applying a mixture of gases, for example carbon dioxide/methane, to the inlet side of the membrane under pressure and collecting a gas mixture enriched in carbon dioxide from the permeate side of the membrane.

EXAMPLES 1–3

The polyimide material and the dense film preparation employed in the examples are illustrated as follows.

The chemical structure of 6FDA-Durene polyimide is shown above. It was synthesized by the method of J. H. Fang, H. Kita and K. Okamoto ("Hyperbranched polyimides for gas separation applications. 1. Synthesis and characterization", *Macromolecules*, 33 (2000) 4693). A 2% (w/w) polymer solution was prepared by dissolving the polyimide in dichloromethane. The polymer solution was then filtered through a Watman's filter (1 um) and cast onto a silicon wafer at ambient temperature. After slow solvent evaporation, the film was dried in a vacuum oven at 250° C. for 48 h to remove the residual solvent.

Three generations of DAB dendrimers were purchased from Aldrich. They were generation 1: polypropylenimine tetraamine dendrimer (DAB-AM-4), generation 2: polypropylenimine octaamine dendrimer (DAB-AM-8) and generation 3: polypropylenimine hexadecaamine dendrimer (DAB-AM-16). For simplicity, this description uses G1, G2, and G3 to denote DAB-AM-4, DAB-AM-8, DAB-AM-16, respectively.

Membrane Treatment

10% (w/v) solutions of DAB dendrimer in methanol were prepared. The treatment was performed by immersing the membrane films in the solution for a stipulated period of time. The films were then washed with fresh methanol immediately after removal from the dendrimer solution in order to remove residual dendrimer solution. They were then dried in air at room temperature for about 1 day.

The FT-IR and Gel Content Measurements

Figure 1:
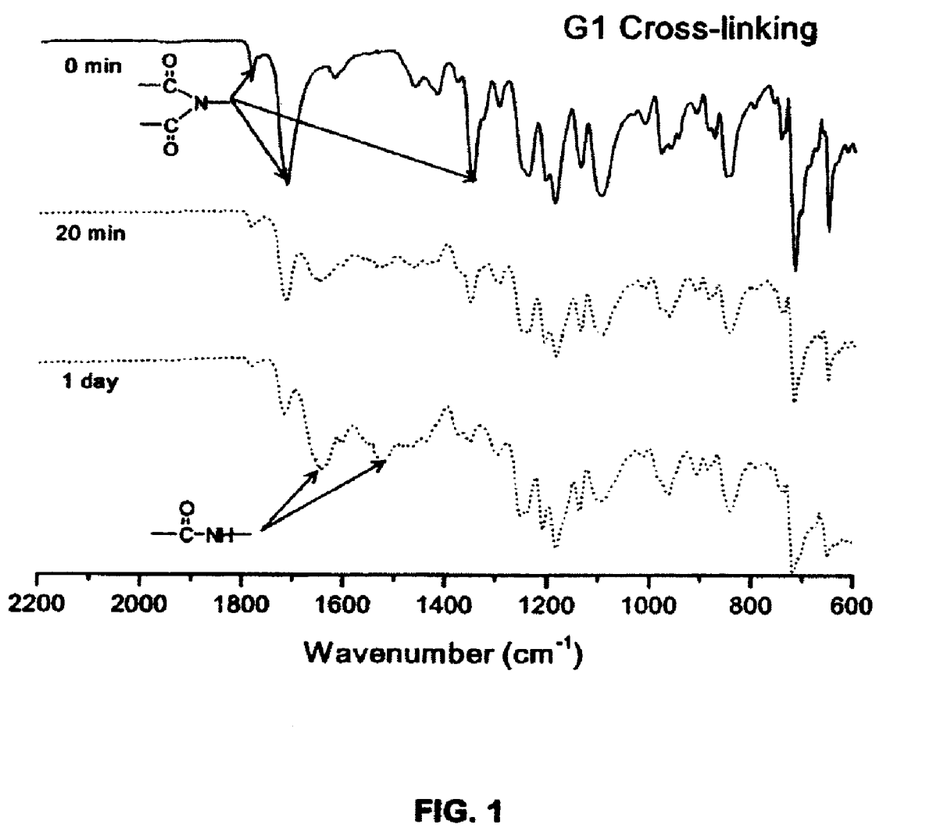

FTIR-ATR measurements were performed using a Perkin Elmer FT-IR Spectrometer Spectrum 2000 to estimate the extent of reaction between DAB dendrimers and polyimide. FIG. 1 presents the FTIR-ATR spectra before and after cross. polyimide. The following Figure presents the FTIR-ATR spectra before and after cross-linking with a DAB dendrimer. The original 6FDA-durene is characterized by bands at around 1782.5 cm$^{-1}$ (attributed to C=O asymmetric stretch of imide groups), 1714.5 cm$^{-1}$ (attributed to C=O symmetric stretch of imide groups), and 1350.9 cm$^{-1}$ (attributed to C—N stretch of imide groups). After cross-linking, the C=O stretch band at around 1646.6 cm$^{-1}$ of amide groups and the C—N stretching of the C—N—H group at around 1520.8 cm$^{-1}$ were present. The intensities of characteristic imide peaks (at 1782.5 cm$^{-1}$ and 1714.5 cm$^{-1}$) decreased, and the intensities of characteristic amide peak (at 1646.6 cm$^{-1}$) increased with the treatment time. This suggests that the degree of cross-linking increased with treatment time. The FTIR-ATR spectra of G2 and G3 dendrimers cross-linked films show similar trends.

The gel contents of cross-linked polyimide membranes were measured by extracting the films in dichloromethane for 24 hrs. The insoluble fractions were vacuum dried at 120° C. for about 1 day. The weights of polyimide films before and after extraction were measured and the gel content was calculated by:

$$\% \text{ Gel Content} = \frac{W_1}{W_0} \times 100\%$$

where $W_1$ and $W_0$ are the insoluble fraction weight and original weight of the cross-linked polymer films, respectively.

Figure 2:
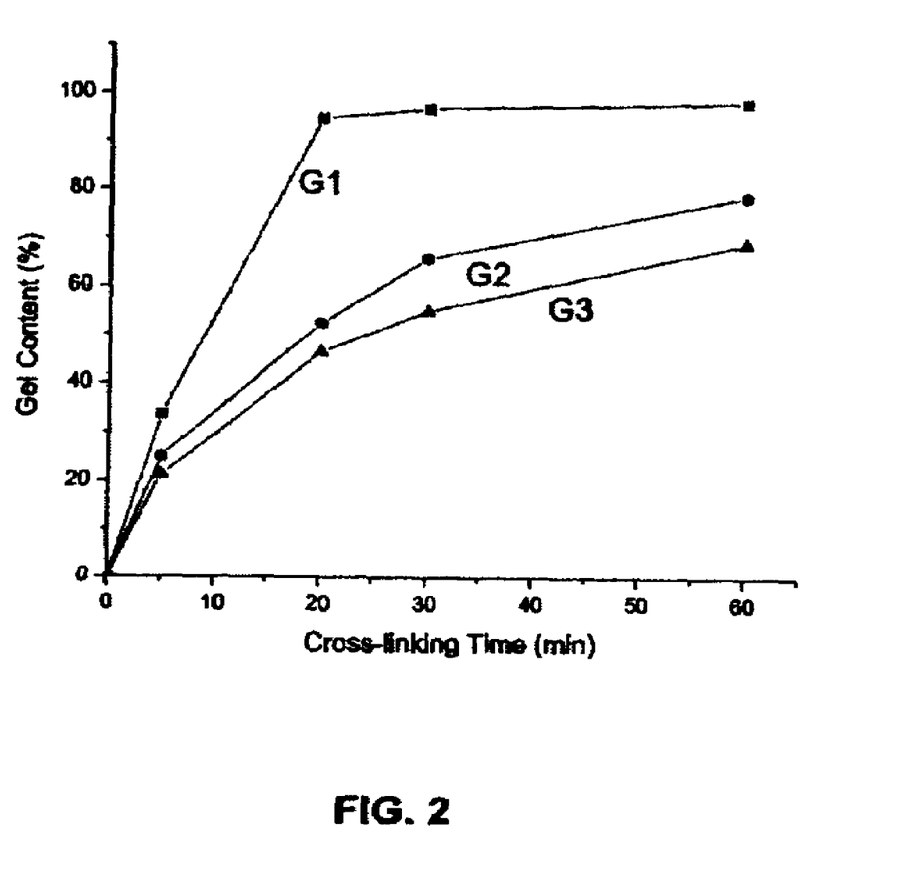

FIG. 2 compares the gel content of cross-linking samples resulting from different generations of DAB dendrimer. For G1 cross-linked samples, after 20 minutes treatment time, the gel content was >94%. The gel content followed the order. G1>G2>G3 for the same treatment time. This agrees with the results from FTIR-ATR.

Measurements of Gas Transport Properties

The pure gas permeabilities were determined by a constant volume and variable pressure is method. Detailed experimental design and procedures have been reported by A. Bos, I. G. M. Punt, M. Wessling and H. Strathmann ("Plasticization-resistant glassy polyimide membranes for CO/CH separations", *Separation and Purif. Tech* 14 (1998) 27). The permeabilities were obtained in the order He, $H_2$, $O_2$, $N_2$, $CH_4$ and $CO_2$ at 35° C. The upstream pressure was 3.5 atm for He and $H_2$ and 10 atm for the other gases.

The ideal separation factor of a membrane for gas A to gas B was evaluated as follows:

$$\alpha_{NB} = \frac{P_A}{P_B}$$

Table 1 summarizes the permeability of the original and G1 cross-linked films, while Table 2 lists the permselectivity, as indicated by the calculated ideal separation factor.

TABLE 1

Gas permeability of original and G1 cross-linked 6FDA-durene

| Immersion Time (min) | P (Barrera) | | | | | |
|---|---|---|---|---|---|---|
| | He | $H_2$ | $O_2$ | $N_2$ | $CH_4$ | $CO_2$ |
| 0 | 490 | 786 | 186 | 55.4 | 45.1 | 612 |
| 5 | 507 | 781 | 129 | 28.6 | 19.2 | 434 |
| 20 | 410 | 562 | 73.6 | 15.2 | 9.27 | 225 |
| 30 | 397 | 546 | 68.0 | 13.1 | 7.55 | 178 |
| 60 | 360 | 468 | 48.0 | 8.20 | 4.18 | 100 |

TABLE 2

Selectivity of 6FDA-durene membranes before and after cross-linking (G1)

| Cross-linking Time (min) | Permselectivity | | | |
|---|---|---|---|---|
| | $H_2/N_2$ | $He/N_2$ | $CO_2/CH_4$ | $H_2/CO_2$ |
| 0 | 14.2 | 8.90 | 13.6 | 1.3 |
| 5 | 27.3 | 17.7 | 22.6 | 1.8 |
| 20 | 37.0 | 27.0 | 24.2 | 2.5 |
| 30 | 41.6 | 30.3 | 23.5 | 3.1 |
| 60 | 57.1 | 44.0 | 23.9 | 4.7 |

Figure 3:
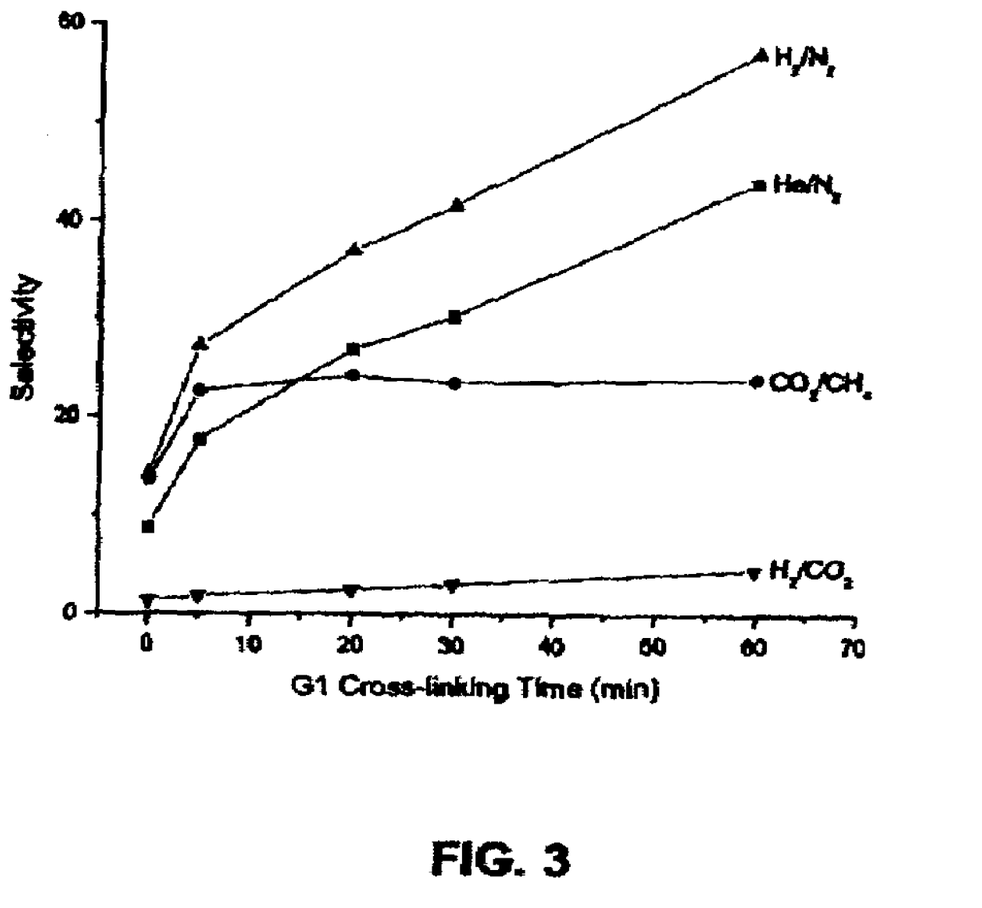

The data in Table 1 indicates that the permeability decreases with cross-linking time after 5 minutes of cross-linking. The data in Table 2, shown graphically in FIG. 3, shows that the permeselectivity increases with increasing treatment (cross-linking) time.

The pure gas tests show that the maximum selectivity increased by about 400%, 300% and 265% for the gas pairs $He/N_2$, $H_2/N_2$ and $H_2/CO_2$ respectively, after 60 minutes of treatment with G1 dendrimer. For the gas pair $CO_2/CH_4$, the maximum increment was about 74% after 20 minutes of treatment with G1.

Figure 4A:
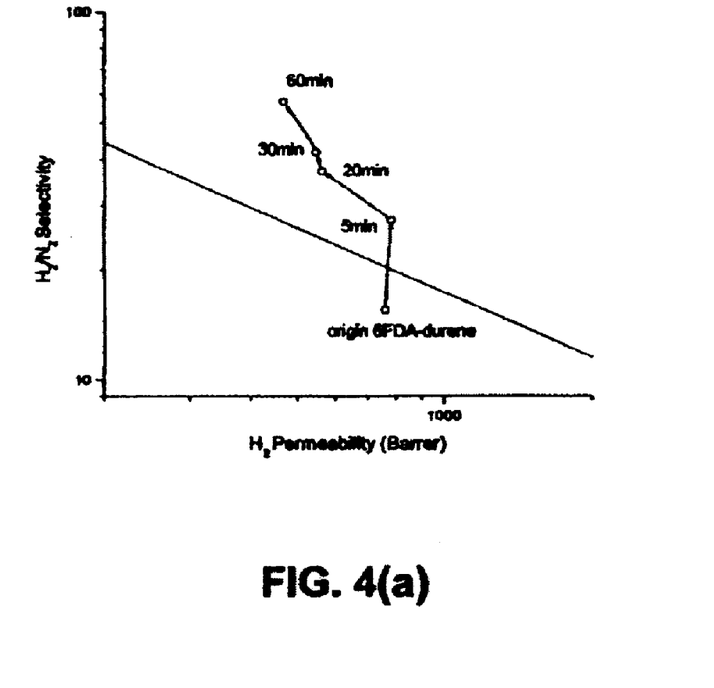
Figure 4B:
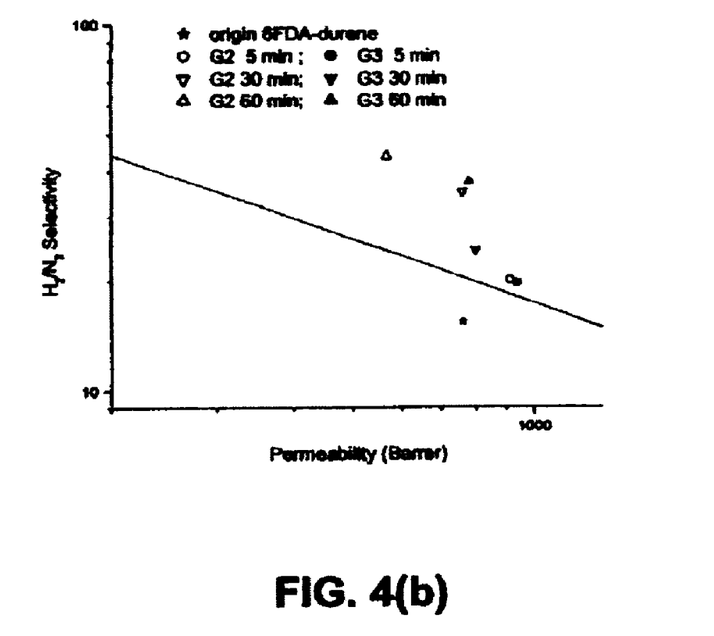

One of the novel aspects of this invention is the ability to achieve superior gas transport properties compared to other polymers. The gas transport properties of G1, G2 and G3 treated polyimide samples are compared with the upper bound materials (data from L. M. Robeson, "Correlation of separation factor versus permeability for polymeric membranes", J. Membr. Sci., 62(1991) 165). FIGS. 4(*a*) and (*b*) demonstrate that all treated 6FDA-durene samples showed excellent gas transport properties, which are above or near to the "supper bound materials". With an increase in cross-linking time, the gas transport properties are further improved and located well above the permselectivity-permeability trade-off line. This suggests that the proposed cross-linking method has great potential to improve polyimide materials for gas separation.

A comparison of gas transport properties with upper bound materials: a. G1 cross-linked membranes; b. G2 and G3 cross-linked membranes

What is claimed is:

1. A process for treating a membrane of the type used in gas separation or pervaporation, the membrane comprising polyimide, the process comprising the steps of:
   (a) directly exposing said polyimide to a dendrimer in a solvent, and
   (b) maintaining said solvent containing said exposed polyimide and said dendrimer at a temperature of less than 100° C. and for a time to allow the compound to crosslink the polyimide.

2. The process of claim 1 wherein said dendrimer comprises a plurality of amine groups.

3. A process according to claim 2 wherein at least two amine groups per molecule of said dendrimer are primary amine groups.

4. The process of claim 1 wherein the dendrimer is a polypropyleneimine dendrimer.

5. The process of claim 1 wherein the dendrimer is of generation up to 4.

6. The process of claim 1 wherein the polyimide is an aromatic polyimide.

7. The process of claim 1 wherein the polyimide comprises the following structural unit:

wherein $Ar_1$ is a tetravalent organic group selected from the group consisting of:

wherein Z is selected from the group consisting of:

Ar$_2$ is an aromatic group selected from the group consisting of:

wherein Z has the same meaning as defined above, and
X, X$_1$, X$_2$ and X$_3$ are independently selected from the group consisting of hydrogen, alkyl groups with 1 to 5 carbon atoms, alkoxy groups with 1 to 5 carbon atoms, phenyl groups, substituted phenyl groups, phenoxy groups and substituted phenoxy groups; and
n is a number sufficient that the polyimide has an inherent viscosity of at least 0.3 dl/g when measured at 25° C. using a 0.5% by weight solution in N-methylpyrrolidinone.

8. The process of claim 1 wherein the polyimide is selected from the group consisting of: polyimides comprising groups delivered from benzophenone tetracarboxylic anhydride (BTDA), methylene diisocyanate (MDI) and toluene diisocyanate (TDI), and polyimides of structure:

9. The process of claim 1 wherein the dendrimer is dissolved in a solvent.

10. The process of claim 9 wherein the solvent is an alcohol.

11. The process of claim 9 wherein the concentration of the dendrimer in the solvent is between about 1 wt % and about 30 wt %.

12. The process of claim 1 wherein said solvent is a first solvent, said process additionally comprising the steps of washing the membrane with a second solvent after said exposing, and of drying the membrane after said washing.

13. The process of claim 1 wherein said solvent is selected from the group consisting of alcohols, ketones, ethers, esters and mixtures thereof.

14. The process of claim 1 wherein the dendrimer is of generation 0 or 1.

* * * * *

UNITED STATES PATENT AND TRADEMARK OFFICE
CERTIFICATE OF CORRECTION

| | | |
|---|---|---|
| PATENT NO. | : 7,169,885 B2 | Page 1 of 1 |
| APPLICATION NO. | : 10/713869 | |
| DATED | : January 30, 2007 | |
| INVENTOR(S) | : Tai-Shung Neal Chung, Mei Lin Chng and Lu Shao | |

It is certified that error appears in the above-identified patent and that said Letters Patent is hereby corrected as shown below:

Column 10, lines 49 to 50, the following text should be deleted:

"cross.polyimide. The following Figure present the FTIR-ATR spectra before and after"

Column 12:

Claim 1, line 40 "compound" should be changed to --dendrimer--

Signed and Sealed this

Seventeenth Day of July, 2007

JON W. DUDAS
*Director of the United States Patent and Trademark Office*